Jan. 13, 1925.
A. U. NELSON
CAN PUNCTURING IMPLEMENT
Filed Feb. 19, 1924
1,523,373
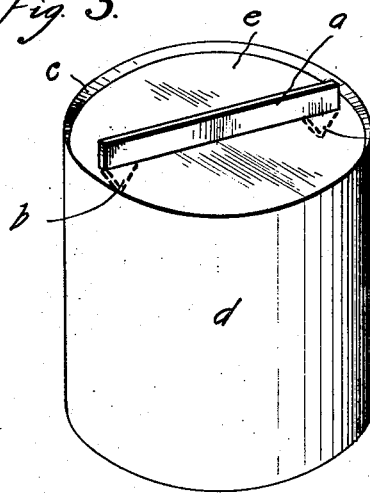
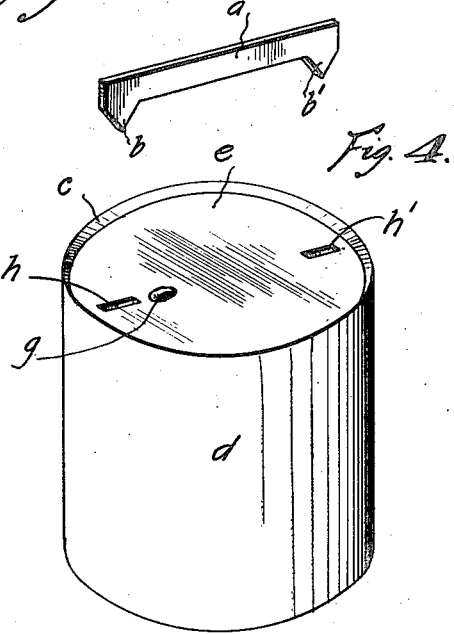
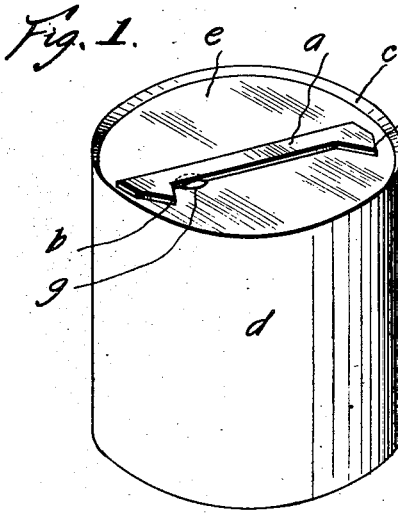
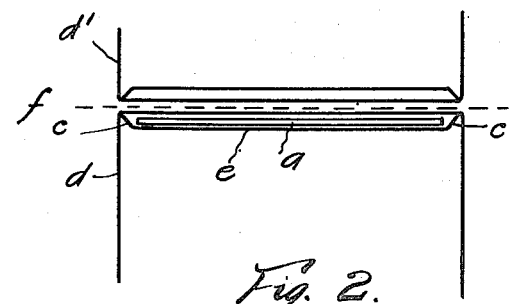
Inventor
Albert U Nelson
F. J. Geisler
By
Attorney Patented Jan. 13, 1925.

1,523,373

UNITED STATES PATENT OFFICE.

ALBERT U. NELSON, OF PORTLAND, OREGON.

CAN-PUNCTURING IMPLEMENT.

Application filed February 19, 1924. Serial No. 693,796.

*To all whom it may concern:*

Be it known that I, ALBERT U. NELSON, a citizen of the United States, and a resident of Portland, county of Multnomah, and State of Oregon, have invented a certain new and useful Improvement in Can-Puncturing Implements, of which the following is a specification.

The object of my invention is to provide a can puncturing or opening implement which is especially adapted for use as a convenient accessory to that type of cans made with a rim-flange projecting perimetrically about one end of the can, and thus providing at that end of the can, a space below the plane touched by said rim-flange; said can puncturing implement being adapted to be carried and preferably temporarily attached to the can within said space.

My invention further has for its object to provide a can puncturing implement which can be made at a trifling cost and which incidentally is adapted to serve as a stopper or closure for the punctures made thereby in the top of the can.

I attain my object by providing an implement of the character mentioned, consisting of a flat body stamped out of a piece of sheet metal. The body consists of an elongate bar provided at each end with a wedge shaped protuberance extending perpendicularly therefrom but lying within the planes of the sides of said implement. The latter being of such thickness that it is adapted to be completely contained within said space provided by said rim flange.

The details of construction and the mode of using my said implement are hereinafter described with references to the accompanying drawings, in which:

Fig. 1 is a perspective view of the top of a can of the type referred to and shows my implement as located within the space provided by said rim flange;

Fig. 2 is a diagrammatic view and illustrates fragments of two cans stacked one upon the other, the top of the lower can being provided with a space as mentioned, in which space my said implement is contained, and the latter being made of such thickness as to lie completely below the plane touched by the rim flange of the top of the can;

Fig. 3 is a perspective view of a can and illustrates the use of my implement for puncturing the top; incidentally illustrates how the implement will later serve as a stopper for the punctures produced by it;

Fig. 4 is a perspective top view of a can showing the character of the punctures made by my implement; and Fig. 5 is a perspective view of my implement.

My can puncturing implement consists of a flat body $a$ stamped out of a piece of sheet metal and is provided at each end with wedge shaped protuberances $b$ and $b'$ extending perpendicularly therefrom but lying within the planes of the sides of the body.

As already mentioned, my puncturing implement is especially designed to be carried by the can on which it is to be used, in a recess formed in one end of the can, bounded by the rim flange $c$. Said rim flange $c$ forms a continuation of the sides of the body $d$ of the can and extends perpendicularly from the end $e$ thereof, thus providing a space between the top of the can $e$ and the plane $f$ touched by said rim flange within which the can puncturing implement $a$ may be completely contained as illustrated in Fig. 2.

The thickness of the body of the implement is therefore so proportioned as to adapt the implement to be located wholly within said space below the plane $f$ touched by the rim flange $c$ of the can, thus permitting the can $d$ provided with said puncturing implement to have another can as $d'$ stacked squarely upon it as also illustrated in Fig. 2.

In order to keep the implement in place on the top of the can it may be secured in place by a drop of solder as illustrated by $g$.

The manner of using my implement is illustrated by Fig. 3. In the first place a blow directed upon the implement when placed across the end $e$ of the can will produce elongate punctures $h$ and $h'$ in said end. When the can is not in use the wedge shaped protrusions $b$ and $b'$ of my implement may be inserted in said punctures and serve as stoppers for the latter for keeping out dust and insects from the interior of the can.

I claim:

1. A can puncturing implement for a can having one substantially flat end and provided at that end with a perimetrical rim flange projecting longitudinally of the body and thus forming a recess at said end bounded by said flange, said implement consisting of a flat body, the body comprising an elongated bar of substantially uniform thickness and provided at each of its ends with a wedge-shaped protuberance extending perpendicularly therefrom but lying within the planes of the sides of said implement, thus permitting the protuberances to lie parallel to said end.

2. A can puncturing implement for a can having one substantially flat end and provided at that end with a perimetrical rim flange projecting longitudinally of the body and thus forming a recess at said end bounded by said flange, said implement consisting of a flat body, the body comprising an elongated bar of substantially uniform thickness and provided at each of its ends with a wedge-shaped protuberance extending perpendicularly therefrom but lying within the planes of the sides of said implement, said implement having a thickness adapted to permit it to be contained within the said space and below the plane of the top of said rim-flange, thereby permitting the protuberances to be parallel to said end, and permitting the can provided with said implement to have another can stacked upon it squarely without interference by said implement.

ALBERT U. NELSON.